United States Patent
Mochizuki et al.

(10) Patent No.: US 10,801,701 B2
(45) Date of Patent: *Oct. 13, 2020

(54) PHOSPHOR WHEEL, LIGHT SOURCE UNIT, AND IMAGE DISPLAY DEVICE

(71) Applicant: Sony Corporation, Tokyo (JP)

(72) Inventors: Takahiro Mochizuki, Kanagawa (JP); Yoshihisa Aikoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/550,817

(22) Filed: Aug. 26, 2019

(65) Prior Publication Data

US 2019/0376665 A1 Dec. 12, 2019

Related U.S. Application Data

(63) Continuation of application No. 16/236,132, filed on Dec. 28, 2018, now Pat. No. 10,436,421, which is a (Continued)

(30) Foreign Application Priority Data

Jul. 3, 2014 (JP) ................................. 2014-137613

(51) Int. Cl.
*F21V 14/08* (2006.01)
*F21V 9/40* (2018.01)
(Continued)

(52) U.S. Cl.
CPC ............ *F21V 14/08* (2013.01); *F21S 10/007* (2013.01); *F21V 9/30* (2018.02); *F21V 9/40* (2018.02);
(Continued)

(58) Field of Classification Search
CPC ... F21V 14/08; F21V 9/40; F21V 9/30; H04N 9/3144; H04N 9/3161; H04N 9/31;
(Continued)

(56) References Cited

U.S. PATENT DOCUMENTS 5,666,175 A * 9/1997 Spitzer ............... G02B 27/0093
349/95
9,851,075 B2 12/2017 Mochizuki et al.
(Continued)

FOREIGN PATENT DOCUMENTS

CN 1743946 A 3/2006
CN 101059645 A 10/2007
(Continued)

OTHER PUBLICATIONS

U.S. Appl. No. 15/321,456, filed Dec. 22, 2016, Mochizuki et al.
(Continued)

*Primary Examiner* — Evan P Dzierzynski
(74) *Attorney, Agent, or Firm* — Wolf, Greenfield & Sacks, P.C.

(57) ABSTRACT

To provide a phosphor wheel capable of restraining vibration caused by a driving unit for rotatably driving a wheel and reducing noise in a high frequency band. The phosphor wheel includes: a wheel substrate that has a surface on which a fluorescent material is provided; a driving unit that rotates the wheel substrate; a support portion that supports the driving unit and is fixed to a housing; and a buffer member that is provided to fill a space between the support portion and a part of the housing.

12 Claims, 8 Drawing Sheets

Related U.S. Application Data continuation of application No. 15/816,318, filed on Nov. 17, 2017, now Pat. No. 10,203,093, which is a continuation of application No. 15/321,456, filed as application No. PCT/JP2015/058902 on Mar. 24, 2015, now Pat. No. 9,851,075.

(51) Int. Cl.

| | | |
|---|---|---|
| *F21V 9/30* | (2018.01) | |
| *H04N 9/31* | (2006.01) | |
| *F21S 10/00* | (2006.01) | |
| *G02B 26/00* | (2006.01) | |
| *G03B 21/00* | (2006.01) | |
| *G03B 21/20* | (2006.01) | |
| *G03B 33/12* | (2006.01) | |

(52) U.S. Cl.
CPC ......... *G02B 26/008* (2013.01); *G03B 21/006* (2013.01); *G03B 21/204* (2013.01); *G03B 21/2066* (2013.01); *G03B 33/12* (2013.01); *H04N 9/31* (2013.01); *H04N 9/3144* (2013.01); *H04N 9/3161* (2013.01)

(58) Field of Classification Search
CPC ... F21S 10/007; G02B 26/008; G03B 21/006; G03B 21/204; G03B 21/2066; G03B 33/12

See application file for complete search history.

(56) References Cited

U.S. PATENT DOCUMENTS

| | | | |
|---|---|---|---|
| 10,203,093 B2 | 2/2019 | Mochizuki et al. | |
| 10,436,421 B2* | 10/2019 | Mochizuki | G03B 33/12 |
| 2002/0003704 A1 | 1/2002 | Ohmae et al. | |
| 2004/0036967 A1 | 2/2004 | Haggerty et al. | |
| 2004/0239881 A1* | 12/2004 | Kim | H04N 9/3117 |
| | | | 353/20 |
| 2010/0328632 A1 | 12/2010 | Kurosaki et al. | |
| 2012/0013854 A1 | 1/2012 | Nishimura et al. | |
| 2013/0038847 A1 | 2/2013 | Katou | |
| 2014/0362350 A1 | 12/2014 | Takamatsu | |
| 2015/0098065 A1* | 4/2015 | Tanaka | G03B 21/2013 |
| | | | 353/84 |
| 2017/0082912 A1 | 3/2017 | Wakabayashi et al. | |
| 2017/0211783 A1 | 7/2017 | Mochizuki et al. | |
| 2017/0242241 A1* | 8/2017 | Nojima | G02B 26/008 |
| 2018/0094795 A1 | 4/2018 | Mochizuki et al. | |
| 2019/0137078 A1 | 5/2019 | Mochizuki et al. | |

FOREIGN PATENT DOCUMENTS

| | | |
|---|---|---|
| CN | 101937161 A | 5/2011 |
| CN | 102566227 A | 7/2012 |
| JP | 2001-100309 A | 4/2001 |
| JP | 2002-090886 A | 3/2002 |
| JP | 2008-190434 A | 8/2008 |
| JP | 2008-267522 A | 11/2008 |
| JP | 2009-265137 A | 11/2009 |
| WO | WO 2010/116444 A1 | 10/2010 |

OTHER PUBLICATIONS

U.S. Appl. No. 15/816,318, filed Nov. 17, 2017, Mochizuki et al.
U.S. Appl. No. 16/236,132, filed Dec. 28, 2018, Mochizuki et al.
Chinese Office Action dated Mar. 19, 2018 in connection with Chinese Application No. 2015800350510 and English translation thereof.
International Search Report and English translation thereof dated Jun. 23, 2015 in connection with International Application No. PCT/JP2015/058902.
International Written Opinion and English translation thereof dated Jun. 23, 2015 in connection with international Application No. PCT/JP2015/058902.
International Preliminary Report on Patentability and English translation thereof dated Jan. 12, 2017 in connection with International Application No. PCT/JP2015/058902.

* cited by examiner

PHOSPHOR WHEEL, LIGHT SOURCE UNIT, AND IMAGE DISPLAY DEVICE

CROSS REFERENCES TO RELATED APPLICATIONS

This application is a continuation of and claims the benefit under 35 U.S.C. § 120 of U.S. patent application Ser. No. 16/236,132, titled "PHOSPHOR WHEEL, LIGHT SOURCE UNIT, AND IMAGE DISPLAY DEVICE," filed on Dec. 28, 2018, now U.S. Pat. No. 10,436,421, which is a continuation of and claims the benefit under 35 U.S.C. § 120 of U.S. patent application Ser. No. 15/816,318, titled "PHOSPHOR WHEEL, LIGHT SOURCE UNIT, AND IMAGE DISPLAY DEVICE," filed on Nov. 17, 2017, now U.S. Pat. No. 10,203,093, which is a continuation of and claims the benefit under 35 U.S.C. § 120 of U.S. patent application Ser. No. 15/321,456, titled "PHOSPHOR WHEEL, LIGHT SOURCE UNIT, AND IMAGE DISPLAY DEVICE," filed on Dec. 22, 2016, now U.S. Pat. No. 9,851,075, which is the National Stage of International Application No. PCT/JP2015/058902, filed in the Japanese Patent Office as a Receiving Office on Mar. 24, 2015, which claims priority to Japanese Patent Application No. JP 2014-137613, filed in the Japanese Patent Office on Jul. 3, 2014 which are hereby incorporated by reference in their entirety.

TECHNICAL FIELD

The present disclosure relates to a phosphor wheel, a light source unit, and an image display device.

BACKGROUND ART

In recent years, a projector device has been widely known as an image display device for displaying a projection image on a plane of projection such as a screen. The projector device is used not only in offices but also in homes and has various display formats such as a CRT method, a liquid crystal method, a DLP method, and an LCOS method.

Such a projector device includes various driving units such as motors. For example, there are motors for rotating a color wheel that spectrally disperses light from a light source in accordance with a transmission property and a phosphor wheel on which a fluorescent material is provided, the fluorescent material being material that, when the fluorescent material is irradiated with light in a particular wavelength region, emits light in a wavelength region different from that of the light. When vibration is generated by driving those driving units, noise is generated from the projector device in some cases. Therefore, removal of noise caused by the driving unit has been studied.

For example, Patent Literature 1 discloses a color wheel device in which a metal plate member is provided between a motor for driving a color wheel and a mounting plate fixed to an optical unit. In Patent Literature 1, vibration is restrained by increasing the weight of the color wheel device with the use of the metal plate member. For example, Patent Literature 2 discloses a fan retention structure in which a vibration isolation sponge is interposed between suction-side and delivery-side tubular frames of an axial-flow fan.

CITATION LIST

Patent Literature

Patent Literature 1: JP 2009-265137A
Patent Literature 2: JP 2008-190434A

SUMMARY OF INVENTION

Technical Problem

However, in Patent Literature 1 described above, the motor is supported by the mounting plate in a cantilevered state, and therefore vibration of the motor is easily transmitted to the optical unit and the like. Further, it is difficult to apply a technique disclosed in Patent Literature 2 described above to a color wheel, a phosphor wheel, or the like.

In view of this, the present disclosure proposes a phosphor wheel, a light source unit, and an image display device, each of which is new, is improved, and is capable of restraining vibration caused by a driving unit for rotatably driving a wheel and reducing noise in a high frequency band.

Solution to Problem

According to the present disclosure, there is provided a phosphor wheel including: a wheel substrate that has a surface on which a fluorescent material is provided; a driving unit that rotates the wheel substrate; a support portion that supports the driving unit and is fixed to a housing; and a buffer member that is provided to fill a space between the support portion and a part of the housing.

According to the present disclosure, there is provided a light source unit including: a light source; and a phosphor wheel that includes a fluorescent material that, when the fluorescent material is irradiated with light emitted from the light source, emits fluorescence emission light in a different wavelength region. The phosphor wheel includes a wheel substrate that has a surface on which the fluorescent material is provided, a driving unit that rotates the wheel substrate, a support portion that supports the driving unit and is fixed to a housing, and a buffer member that is provided to fill a space between the support portion and a part of the housing.

According to the present disclosure, there is provided an image display device including: a light source unit that includes a light source and a phosphor wheel including a fluorescent material that, when the fluorescent material is irradiated with light emitted from the light source, emits fluorescence emission light in a different wavelength region; and an optical system that projects an image formed on the basis of a luminous flux emitted from the light source unit onto a plane of projection. The phosphor wheel of the light source unit includes a wheel substrate that has a surface on which a fluorescent material is provided, a driving unit that rotates the wheel substrate, a support portion that supports the driving unit and is fixed to a housing, and a buffer member that is provided to fill a space between the support portion and a part of the housing.

Advantageous Effects of Invention

As described above, according to the present disclosure, it is possible to restrain vibration caused by a driving unit for rotatably driving a wheel and reduce noise in a high frequency band. Note that the effects described above are not necessarily limitative. With or in the place of the above effects, there may be achieved any one of the effects described in this specification or other effects that may be grasped from this specification.

DESCRIPTION OF EMBODIMENT(S)

Figure 1:
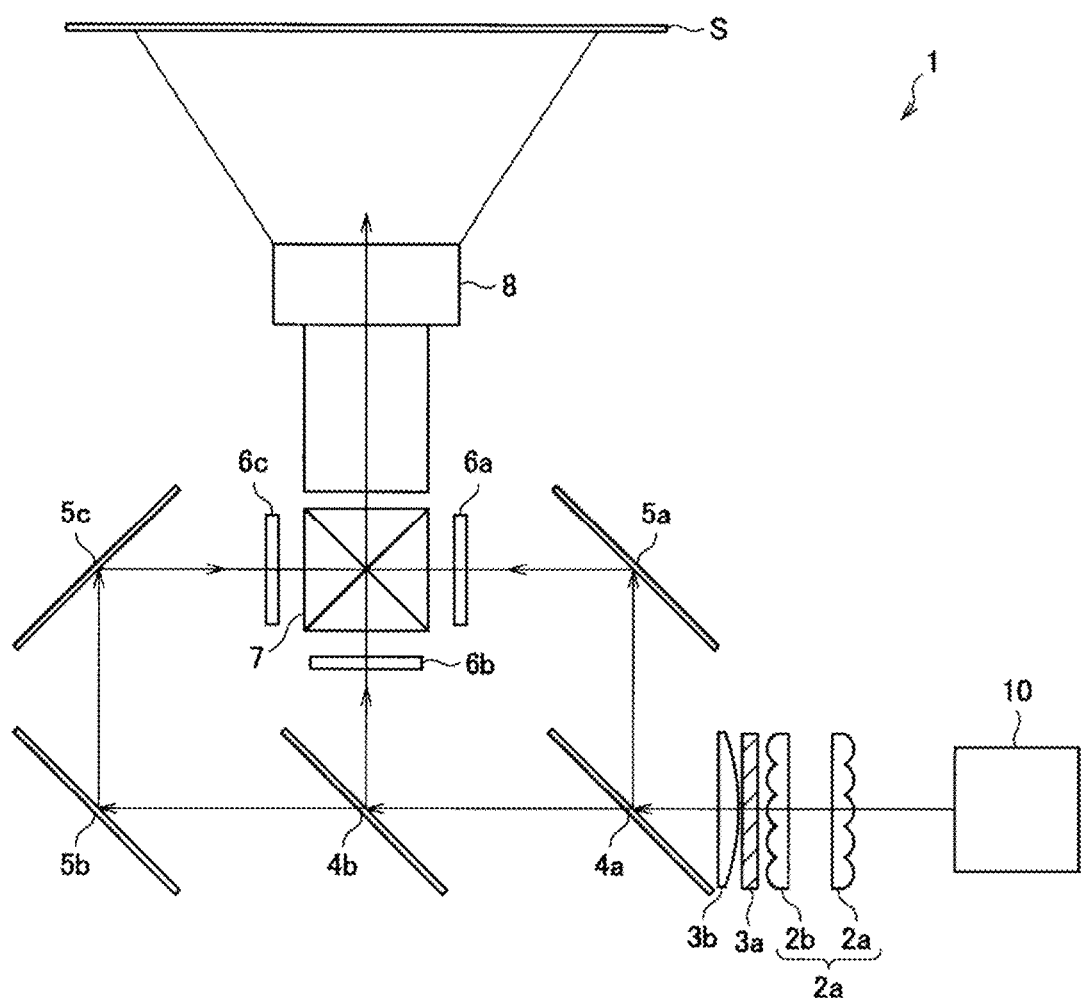
FIG. 1 is a schematic configuration diagram showing one configuration example of an image display device including a light source unit according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Configuration of image display device
2. Configuration of light source unit
3. Noise reduction in light source section
4. Conclusion

1. Configuration of Image Display Device

One configuration example of an image display device 1 including a light source unit 10 according to an embodiment of the present disclosure will be described with reference to FIG. 1. FIG. 1 is a schematic configuration diagram showing one configuration example of the image display device 1 including the light source unit 10 according to the present embodiment.

The image display device 1 according to the present embodiment is one configuration example of a projector that condenses light from a light source for emitting light, emits the light through a projection lens via a device for displaying an image, and projects an image on a display surface such as a screen S. The image display device 1 shown in FIG. 1 is one configuration example of a projector including a 3LCD as a microdisplay.

Light emitted from the light source unit 10 passes through an integrator lens 2 including a first lens array 2a and a second lens array 2b in order to maintain brightness also in edges of a display image, then passes through a polarization conversion element 3a and a condenser lens 3b, and is separated for each wavelength region.

The light that has passed through the condenser lens 3b is incident on a first reflection dichroic mirror 4a that reflects only light in a red wavelength region and causes light in the other wavelength regions to pass therethrough. Thus, the light in the red wavelength region is reflected by the first reflection dichroic mirror 4a to travel to a reflection mirror 5a. The light in the red wavelength region is further reflected by the reflection mirror 5a to be incident on a liquid crystal panel 6a for red.

The light in other wavelength regions, which has passed through the first reflection dichroic mirror 4a, is incident on a second reflection dichroic mirror 4b. The second reflection dichroic mirror 4b reflects only light in a green wavelength region and causes light in the other wavelength region, i.e., light in a blue wavelength region to pass therethrough. The light in the green wavelength region reflected by the second reflection dichroic mirror 4b is incident on the liquid crystal panel 6b for green. The light in the blue wavelength region, which has passed through the second reflection dichroic mirror 4b, is reflected by reflection mirrors 5b and 5c and is then incident on a liquid crystal panel 6c for blue.

The liquid crystal panels 6a to 6c for respective colors modulate the light that has been incident thereon in accordance with input image signals and generate signal light beams of an image corresponding to RGB. For the liquid crystal panels 6a to 6c, for example, a transmissive liquid crystal element including a high temperature polysilicon TFT may be used. The signal light beams modulated by the liquid crystal panels 6a to 6c are incident on a dichroic prism 7 and are combined with one another. The dichroic prism 7 is formed as a rectangular parallelepiped by combining four triangular prisms so as to reflect the red signal light beam and the blue signal light beam and cause the green signal light beam to transmit therethrough. The signal light beams of the respective colors combined by the dichroic prism 7 are incident on a projection lens 8 and are projected as an image on the display surface such as the screen S.

In the image display device 1, the liquid crystal panels 6a to 6c and the dichroic prism 7 function as a light modulation combination system for modulating and combining incident light. The integrator lens 2, the polarization conversion element 3a, the condenser lens 3b, the reflection dichroic mirrors 4a and 4b, and the reflection mirrors 5a to 5c function as an illumination optical system for introducing light from the light source unit 10 to the liquid crystal panels 6a to 6c constituting the light modulation combination system. In addition, and the projection lens 8 functions as a projection optical system for projecting an image emitted from the dichroic prism 7.

2. Configuration of Light Source Unit

Figure 2:
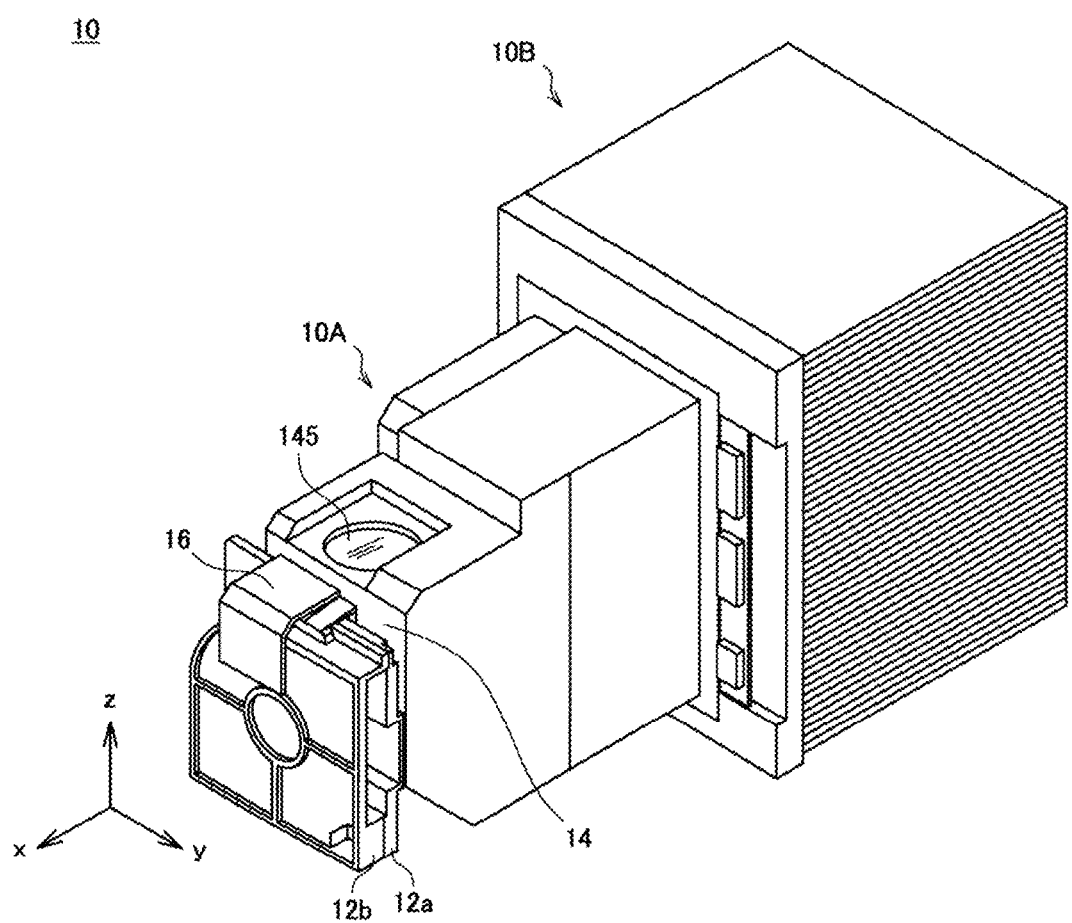
FIG. 2 is a schematic perspective view showing one configuration of the light source unit according to this embodiment.
Figure 3:
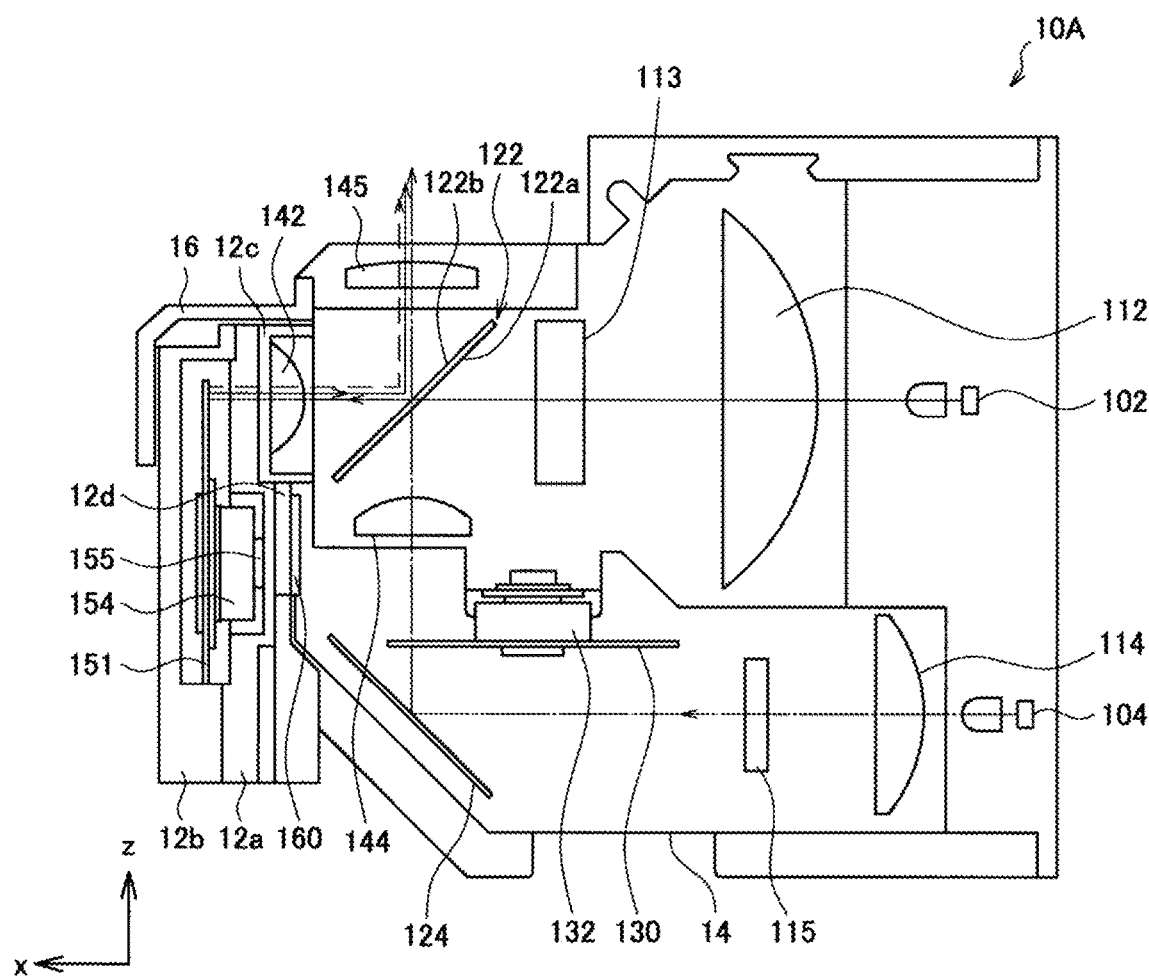
FIG. 3 is a schematic plan view showing one configuration of a light source section of the light source unit according to this embodiment.

As the light source unit 10 of the image display device 1, a light source device using fluorescence emission light generated by irradiating a fluorescent material with light from a solid state light source is used in this technique. One configuration example of the light source unit 10 will be described with reference to FIG. 2 and FIG. 3. Note that FIG. 2 is a schematic perspective view showing one configuration of the light source unit 10 according to the present embodiment. FIG. 3 is a schematic plan view showing one configuration of a light source section 10A of the light source unit 10 according to the present embodiment.

As shown in FIG. 2, the light source unit 10 according to the present embodiment includes the light source section 10A for emitting light and a cooling section 10B for cooling the light source section 10A. In the present embodiment, as shown in FIG. 3, the light source section 10A is a reflective light source device using a fluorescent material.

As shown in FIG. 3, the light source section 10A according to the present embodiment includes a first light source 102 and a second light source 104 as light sources. Note that, although FIG. 3 only shows the single first light source 102 and the single second light source 104, the present disclosure is not limited to this example. One or a plurality of first light sources 102 and one or a plurality of second light sources 104 may be provided. The first light source 102 is a light source for irradiating (exciting) a fluorescent material, and, for example, a laser may be used. The first light source 102 is a light source for causing a fluorescent material (reference sign 152 in FIG. 4) for modulating a wavelength to efficiently emit light, and, in the present embodiment, a laser for the blue wavelength region is used. As the fluorescent material, for example, a YAG-based fluorescent material is used.

The second light source 104 emits light in a wavelength region of color that is insufficient in the first light source 102 and fluorescence emission light caused by the fluorescent material. In the present embodiment, the second light source 104 is a laser for emitting light in the blue wavelength region.

Light emitted from the first light source 102 is incident on a first dichroic mirror 122 constituting the light source section 10A through lenses 112 and 113. The fluorescent material 152 provided on a wheel substrate 151 is irradiated with the light that has been incident on the first dichroic mirror 122 from the first light source 102 through lenses 142 and 143 (see FIG. 8), thereby generating light in two wavelength regions. The lenses 142 and 143 are arranged on an optical path the same as that of the first light source 102, and the first dichroic mirror 122 is arranged between the first light source 102 and the lens 142. The first dichroic mirror 122 is provided to have an inclination of about 45° with respect to, for example, the optical path between the first light source 102 and the lenses 142 and 143. The fluorescent material 152 is arranged so that light is condensed by the lenses 142 and 143 into the fluorescent material 152. At this time, in order to improve a cooling performance of the wheel substrate 151, it is preferable to condense light by using the lens 143 in the vicinity of a peripheral portion of the wheel substrate 151 than to condense light in the vicinity of the center thereof.

The light emitted from the first light source 102 is incident on a first surface 122a of the first dichroic mirror 122. The first dichroic mirror 122 causes the light of the first light source 102 which has been incident on the first surface 122a to transmit therethrough. Further, the first dichroic mirror 122 reflects, on a second surface 122b, fluorescence emission light caused by the fluorescent material 152 that is arranged to face to the first light source 102 via the first dichroic mirror 122 and the lenses 142 and 143 and reflected light of the first light source 102. The light emitted from the first light source 102 passes through the first dichroic mirror 122 and is condensed by the lenses 142 and 143, and therefore the fluorescent material 152 is irradiated with the light.

The fluorescent material 152 is a YAG-based fluorescent material and, when the fluorescent material is irradiated with light in the blue wavelength region by the first light source 102, absorbs the light and emits light in a wavelength region different from the blue wavelength region. The fluorescent material 152 is applied to, for example, the disc-shaped wheel substrate 151 made of metal such as aluminum. The fluorescent material 152 may be applied only to the peripheral portion thereof or may be applied to the whole surface thereof.

The wheel substrate 151 constitutes a phosphor wheel 150 rotated about a rotating shaft 155 provided at the center thereof as the center of rotation by a motor 154 serving as a driving unit. This is a mechanism for preventing light emission efficiency of the fluorescent material 152 from being reduced because the wheel substrate 151 is heated by irradiation with light and preventing resin for use in adhesion between the wheel substrate 151 and the fluorescent material 152 from being melted. By rotating the wheel substrate 151 and rotating the fluorescent material 152, it is possible to improve the cooling performance of the wheel substrate 151 and improve the light emission efficiency of the fluorescent material 152.

The fluorescence emission light emitted by the fluorescent material 152 is, for example, light in a yellow wavelength region and passes through the lenses 143 and 142 to be incident on the second surface 122b of the first dichroic mirror 122 together with the light in the blue wavelength region reflected by the wheel substrate 151 without being absorbed by the fluorescent material 152. In that case, by providing a function of rotating or disturbing polarized light when light in the blue wavelength region is reflected by a surface of the wheel substrate 151, the light can be efficiently reflected by the first dichroic mirror 122. The first dichroic mirror 122 reflects the fluorescence emission light and the reflected light incident on the second surface 122b toward a lens 145.

Meanwhile, light emitted from the second light source 104 is incident on a second dichroic mirror 124 through lenses 114 and 115. The lenses 114 and 115 are arranged in order on an optical path the same as that of the second light source 104, and the second dichroic mirror 124 is arranged on an extension line thereof. The second dichroic mirror 124 reflects the light incident from the second light source 104 and causes the light to be incident on the first dichroic mirror 122 through a transmissive wheel 130 and a lens 144. That is, the second dichroic mirror 124 is provided at a position at which a direction of incident light from the second light source 104 intersects with arrangement directions of the first dichroic mirror 122 and the lens 145. At this time, the second dichroic mirror 124 is provided to have an inclination of about 45° with respect to optical paths of the second light source 104 and the lenses 114 and 115 so that, for example, the second dichroic mirror 124 is substantially symmetrical to the first dichroic mirror 120.

The light of the second light source 104 reflected by the second dichroic mirror 124 is incident on the first dichroic mirror 122 through the transmissive wheel 130 and the lens 144. Then, the light of the second light source 104 passes through the first dichroic mirror 122 and is combined with an emitted light beam from the first light source 102, the emitted light beam being composed of the fluorescence emission light and the reflected light. The combined light is emitted from the light source section 10A through the lens 145.

3. Noise Reduction in Light Source Section

Herein, the image display device 1 includes a plurality of driving units to drive a cooling fan, a phosphor wheel, a color wheel, and the like. When those driving units are operated at the time of use of the image display device 1, driving sound is generated. Driving sound of the driving units has such a low volume that the driving sound does not bother a user in the first place, or the driving units are arranged in a sealed space so that sound is hardly transmitted from the sealed space to the outside, and therefore the driving sound does not give an unpleasant feeling to the user of the image display device 1 in most cases. However, for example, in the case of a driving unit arranged in a space that is not sealed, vibration sound of driving sound may become noise.

As the driving units of the image display device 1, there are motors for rotatably driving a color wheel and the phosphor wheel 150. The motors thereof generate motor noise at high frequency of about 6000 Hz in some cases. High-frequency sound tends to be perceived as harsh sound, and therefore it is desirable to reduce such sound. In view of this, in order to reduce noise of the motor 154 of the phosphor wheel 150, the light source section 10A according to the present embodiment includes a buffer member 160 for restraining vibration generated at the time of drive of the motor 154 from being propagated to a housing of the light source unit 10. Hereinafter, a configuration of the phosphor wheel 150 including the buffer member 160 and a function of the buffer member 160 will be described.

Figure 4:
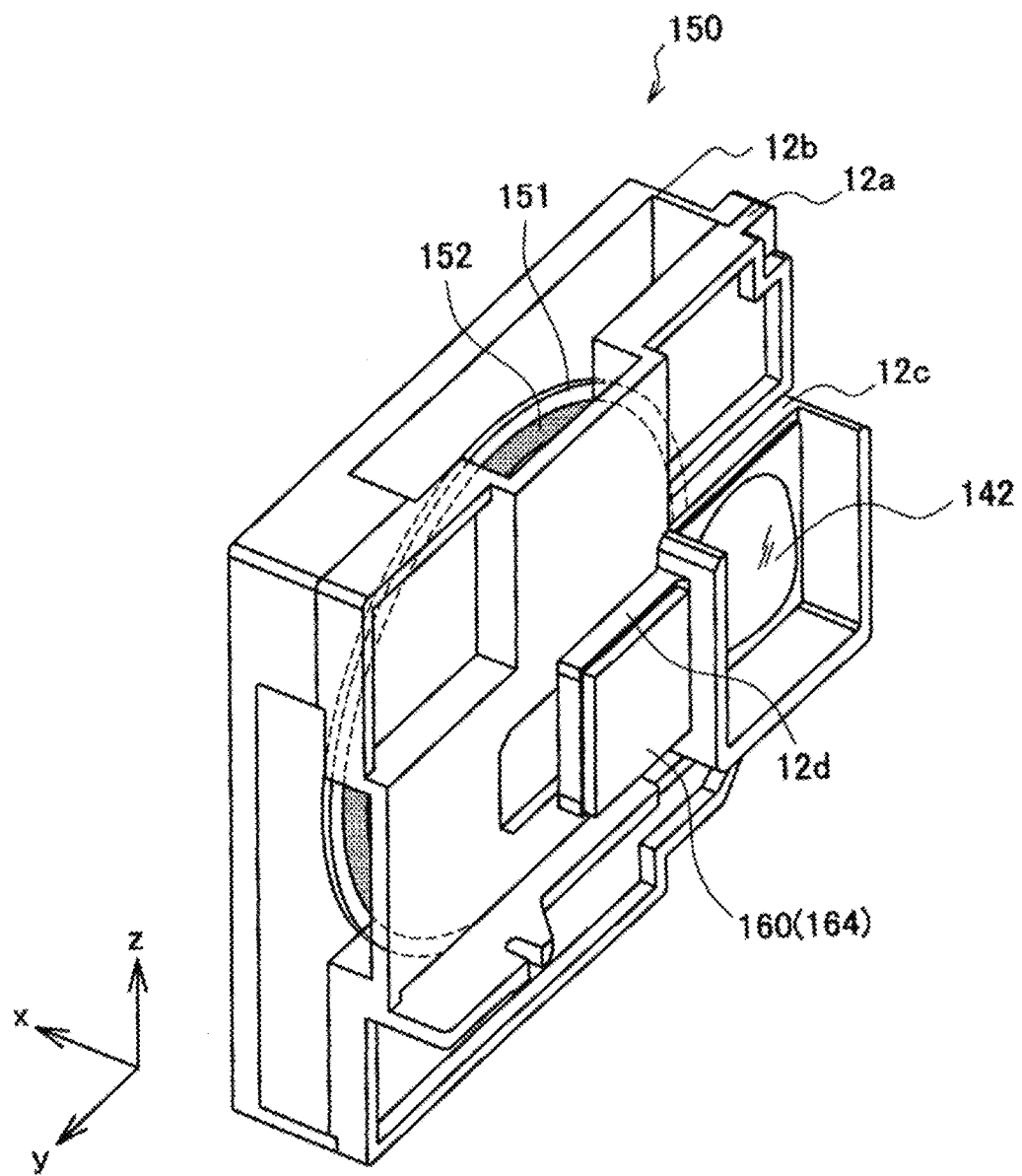
FIG. 4 is a partially enlarged perspective view showing a configuration of a phosphor wheel according to the present embodiment.
Figure 5:
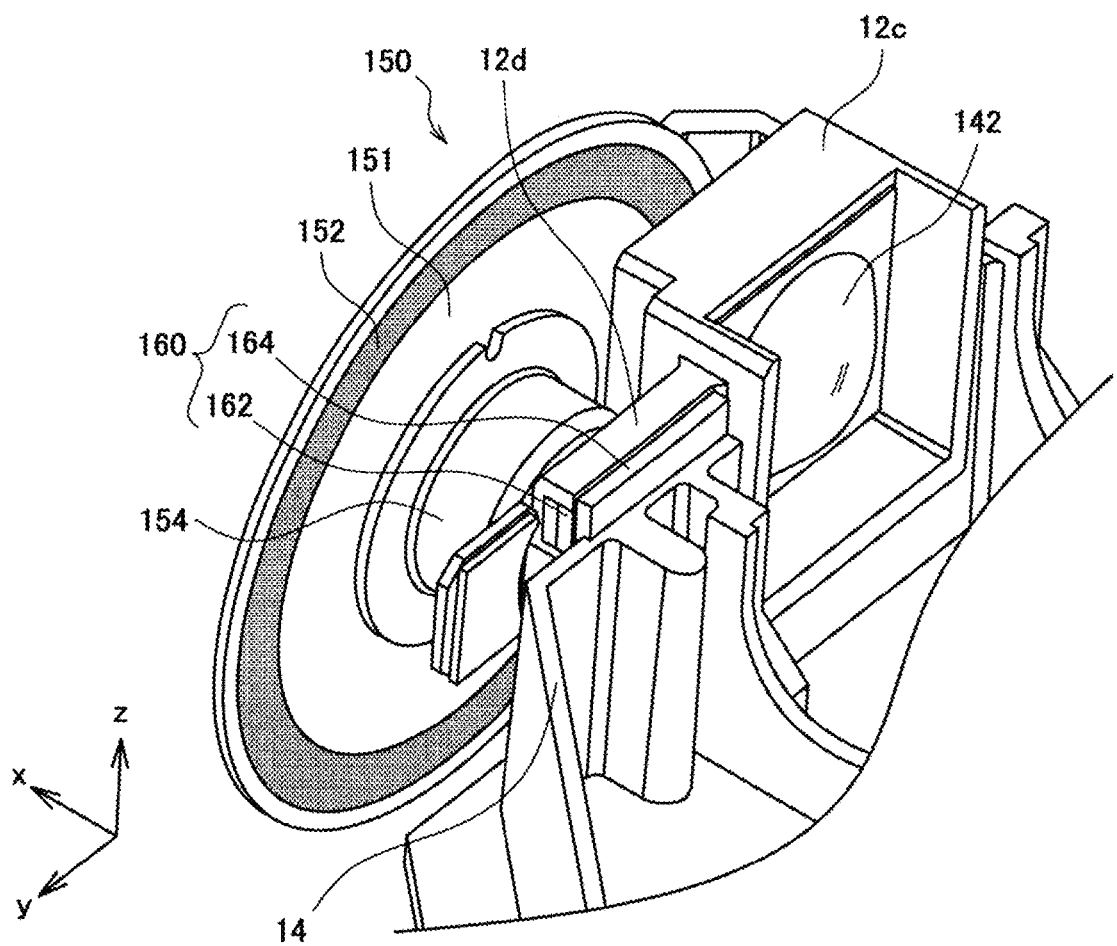
FIG. 5 is a perspective view showing the phosphor wheel according to the present embodiment, the phosphor wheel being stored in a housing.
Figure 6:
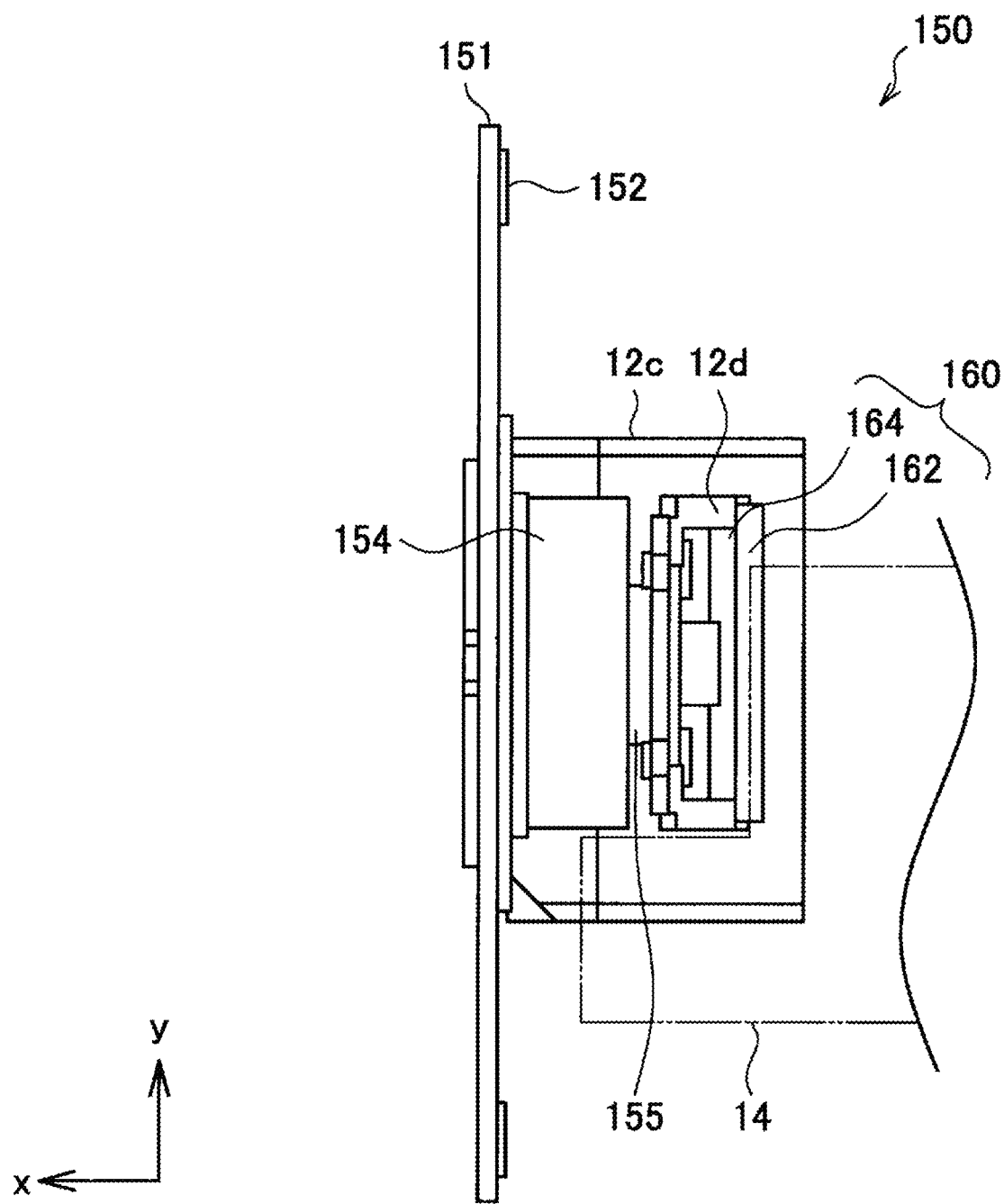
FIG. 6 is a side view of the phosphor wheel according to this embodiment.
Figure 7:
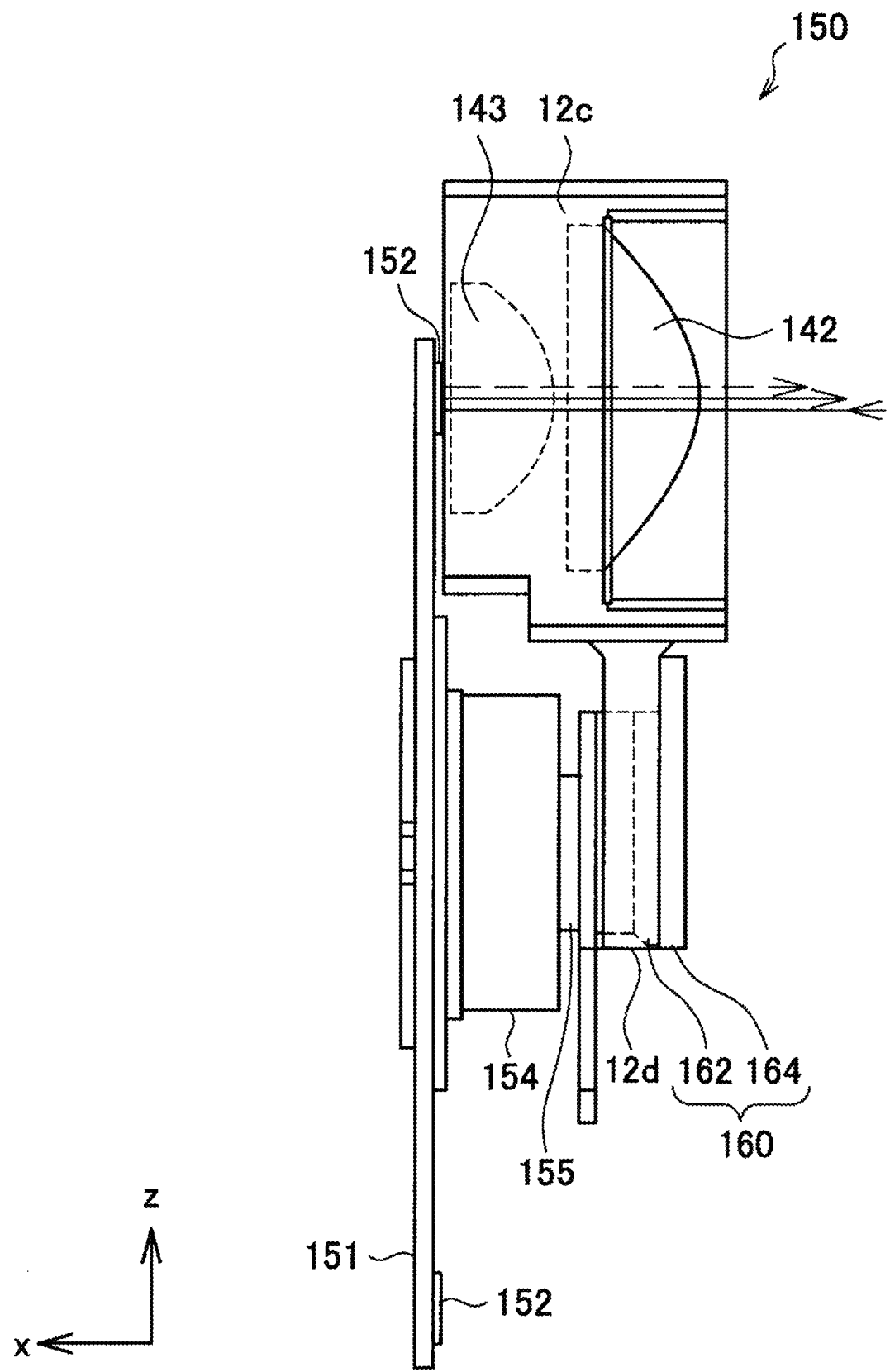
FIG. 7 is a plan view of the phosphor wheel according to this embodiment.
Figure 8:
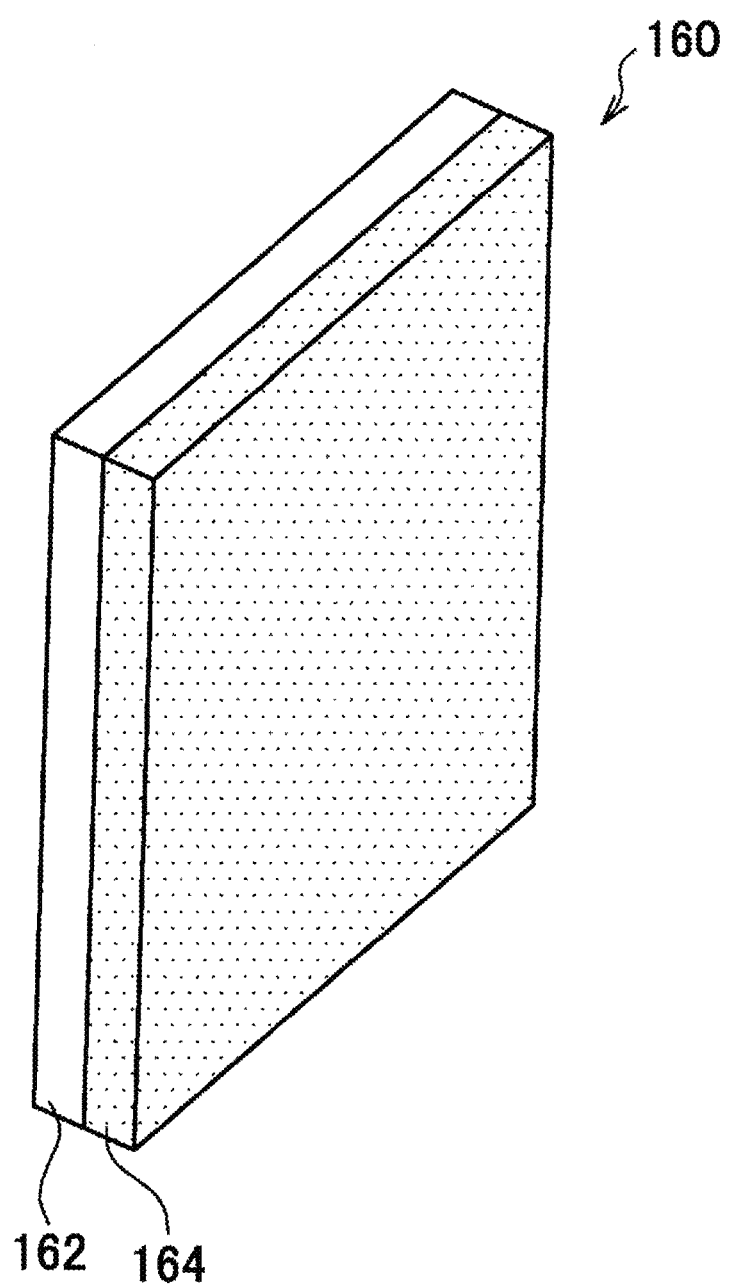
FIG. 8 is an explanatory view showing one configuration example of a buffer member.

The configuration of the phosphor wheel 150 including the buffer member 160 according to the present embodiment will be described with reference to FIGS. 4 to 8. Note that FIG. 4 is a perspective view showing the phosphor wheel 150 according to the present embodiment, the phosphor wheel being stored in the housing. FIG. 5 is a partially enlarged perspective view showing the configuration of the phosphor wheel 150 according to the present embodiment. FIG. 6 is a side view of the phosphor wheel 150 according to the present embodiment. FIG. 7 is a plan view of the phosphor wheel according to the present embodiment. FIG. 8 is an explanatory view showing one configuration example of the buffer member 160.

The phosphor wheel 150 according to the present embodiment is a member for reflecting light incident from the first light source 102 as light in a predetermined wavelength region by using the fluorescent material 152. The fluorescent material 152 is annularly provided in the vicinity of a peripheral portion of a surface of the wheel substrate 151, the surface being positioned on a side on which light is incident from the first light source 102. In the phosphor wheel 150, as shown in FIG. 4, the wheel substrate 151 on which the fluorescent material 152 is provided is arranged in a space formed by wheel storage portions 12a and 12b. The wheel storage portions 12a and 12b are members whose facing surfaces are recessed and store the disc-shaped wheel substrate 151 so as to interpose the wheel substrate 151 therebetween.

A lens support portion 12c is connected to the wheel storage portions 12a and 12b. The lens support portion 12c supports the lenses 142 and 143 through which light incident on or reflected by the fluorescent material 152 of the phosphor wheel 150 passes. As shown in FIG. 4 and FIG. 7, the lens support portion 12c is fixed to the wheel storage portions 12a and 12b so that optical axes of the lenses 142 and 143 are orthogonal to the fluorescent material 152 of the phosphor wheel 150.

As shown in FIG. 5 and FIG. 7, a motor support portion 12d supporting the motor 154 is provided in the lens support portion 12c. The motor support portion 12d is provided to extend from one surface of the lens support portion 12c toward the motor 154. At this time, the motor 154 is supported by the motor support portion 12d so that the rotating shaft 155 of the motor 154 is orthogonal to the optical axes of the lenses 142 and 143.

Herein, a distance between the lenses 142 and 143 supported by the lens support portion 12c and a surface of the phosphor wheel 150 influences brightness of light emitted by the light source unit 10. Therefore, it is desirable to form those members so as not to destroy an optimal positional relationship between the lenses 142 and 143 and the phosphor wheel 150 in the light source unit 10. In the present embodiment, the lens support portion 12c and the motor support portion 12d are integrally formed to maintain a positional relationship between the lenses 142 and 143 and the motor 154 for driving the phosphor wheel 150. Thus, it is possible to achieve optimal brightness of light emitted by the light source unit 10 according to the present embodiment.

As shown in FIG. 4, the phosphor wheel 150 stored in the wheel storage portions 12a and 12b is fixed to a housing 14 of the light source section 10A together with the lenses 142 and 143 supported by the lens support portion 12c and the motor 154 supported by the motor support portion 12d.

Herein, the light source section 10A according to the present embodiment includes the buffer member 160 between the motor 154 supported by the motor support portion 12d and the housing 14. FIG. 5 shows the phosphor wheel 150 in which the wheel storage portions 12a and 12b are removed. As described above, the motor 154 for rotatably driving the phosphor wheel 150 is supported in a cantilevered state by the motor support portion 12d provided to be extend from the lens support portion 12c supporting the lenses 142 and 143. Therefore, vibration of the motor support portion 12d, which is caused by rotatably driving the motor 154, is larger than vibration that is caused when the motor support portion 12d is assumed to be supported on both sides. The vibration of the motor support portion 12d is propagated to the lens support portion 12c and then to the housing 14. Further, the motor 154 of the phosphor wheel 150 generates high-frequency noise in many cases, and this high-frequency sound is amplified while being propagated from the motor support portion 12d to the lens support portion 12c and then to the housing 14.

In view of this, in the light source section 10A according to the present embodiment, as shown in FIG. 5, the buffer member 160 is arranged between a back surface side of the motor 154 supported by the motor support portion 12d (a side opposite to a side of the rotating shaft to which the wheel substrate 151 is provided) and the housing 14 facing thereto. Thus, noise of the motor 154 is prevented from being propagated to the housing 14 of the light source section 10A, and high-frequency sound is prevented from being amplified.

The buffer member 160 is made of a shock absorbing material such as rubber or sponge and is a member filled between the back surface side of the motor 154 and the housing 14 facing thereto. When the buffer member 160 is provided, noise of the motor 154 is absorbed by the buffer member 160, thereby restraining the noise from being propagated to the housing 14 and being amplified.

As shown in FIG. 8, the buffer member 160 according to the present embodiment is formed by bonding two sheet members 162 and 164 different in harness via, for example, an adhesive agent or a double-sided tape. The first sheet member 162 provided on the motor 154 side is softer than the second sheet member 164 provided on the housing 14 side. Because the first sheet member 162 is made of a soft material, it is possible to fit the buffer member 160 to the motor 154 serving as a generation source of noise and effectively absorb noise. In addition, when the sheet members 162 and 164 different in harness are bonded as in the present embodiment, it is possible to effectively attenuate noise in a boundary surface between the first sheet member 162 and the second sheet member 164.

For example, when comparing the case where the buffer member 160 is provided with the case where the buffer member 160 is not provided, a volume of noise generated from the light source unit 10 is substantially the same in a low frequency band of about 1000 Hz or less. However, when the frequency exceeds about 2000 Hz, noise generated in the case where the buffer member 160 is not provided is increased to exceed an allowable range. On the contrary, noise generated in the case where the buffer member 160 is provided falls within the allowable range.

In the case where the whole buffer member 160 is made of a material the same as that of the first sheet member 162 or the whole buffer member 160 is made of a material the same as that of the second sheet member 164, noise is generated as compared with the case of a double structure in the present embodiment, but the noise is restrained as compared with the case where the buffer member 160 is not provided. Also in the case where a hard sheet member is used on the motor 154 side and a soft sheet member is used on the housing 14 side, noise is generated as compared with the case of the double structure in the present embodiment, but the noise is restrained as compared with the case where the buffer member 160 is not provided.

Regarding hardness of the first sheet member 162 and the second sheet member 164 constituting the buffer member 160, for example, the soft first sheet member 162 may have about 35 to 45 degrees and the hard second sheet member 164 may have about 80 to 90 degrees (both are Ascar C hardness). Although thicknesses of the first sheet member 162 and the second sheet member 164 are not particularly limited, the first sheet member 162 and the second sheet member 164 may have, for example, the same thickness.

Note that, although, in FIG. 8, the buffer member 160 is formed by bonding the two sheet members 162 and 164, the present disclosure is not limited to this example, and, for example, the buffer member 160 may be formed by laminating a plurality of sheet members. Also in this case, the harness of a sheet member in contact with the motor 154 only needs to be at least softer than that of sheet members bonded thereto. The thickness of the buffer member 160 and the harness of each sheet member are determined in accordance with the distance between the back surface of the motor 154 and the housing 14 facing thereto so as to appropriately absorb vibration of the motor 154. At this time, the buffer member 160 is easily filled with no gap when the thickness of the whole buffer member 160 is larger than the distance between the back surface of the motor 154 and the housing 14 facing thereto.

4. Conclusion

Hereinabove, the phosphor wheel 150 in the light source unit 10 of the image display device 1 according to an embodiment of the present disclosure has been described. According to the present embodiment, the buffer member 160 is filled between the back surface of the motor 154 and the housing 14 facing thereto in order to reduce noise in a high frequency band generated by vibration of the motor of the phosphor wheel 150. Thus, vibration of the motor 154 is hardly propagated to the housing 14, and therefore it is possible to reduce noise in the high frequency band. The buffer member 160 may be formed by bonding a plurality of sheet members. At this time, when a sheet member on the motor 154 side is formed to be softer than a sheet member on the housing 14 side, it is possible to absorb vibration of the motor 154 more effectively.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, the case where the buffer member 160 is provided in the phosphor wheel 150 of the light source unit 10 has been described. However, this technique is not limited to this example. For example, this technique may be applied to a color wheel or the like.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A phosphor wheel, including:
  a wheel substrate that has a surface on which a fluorescent material is provided;
  a driving unit that rotates the wheel substrate;
  a support portion that supports the driving unit and is fixed to a housing; and
  a buffer member that is provided to fill a space between the support portion and a part of the housing.

(2)

The phosphor wheel according to (1), wherein
  the buffer member is formed by laminating a plurality of sheet members different in hardness in a direction in which the support portion faces to a part of the housing, and
  among the sheet members, a first sheet member in contact with the support portion is softer than a second sheet member in contact with a side of the first sheet member, the side being opposite to a side of the first sheet member in contact with the support portion.

(3)

The phosphor wheel according to (1) or (2),
  wherein the support portion is integrally formed with a lens support portion supporting portion a lens member for introducing light from a light source to the wheel substrate.

(4)

The phosphor wheel according to any one of (1) to (3),
  wherein the buffer member is provided on a side opposite to the wheel substrate in a rotating shaft direction of the driving unit.

(5)

A light source unit, including:
  a light source; and
  a phosphor wheel that includes a fluorescent material that, when the fluorescent material is irradiated with light emitted from the light source, emits fluorescence emission light in a different wavelength region,
  wherein the phosphor wheel includes
    a wheel substrate that has a surface on which the fluorescent material is provided,
    a driving unit that rotates the wheel substrate,
    a support portion that supports the driving unit and is fixed to a housing, and
    a buffer member that is provided to fill a space between the support portion and a part of the housing.

(6)

An image display device, including:
  a light source unit that includes a light source and a phosphor wheel including a fluorescent material that, when the fluorescent material is irradiated with light emitted from the light source, emits fluorescence emission light in a different wavelength region; and
  an optical system that projects an image formed on the basis of a luminous flux emitted from the light source unit onto a plane of projection, wherein the phosphor wheel of the light source unit includes
- a wheel substrate that has a surface on which a fluorescent material is provided,
- a driving unit that rotates the wheel substrate,
- a support portion that supports the driving unit and is fixed to a housing, and
- a buffer member that is provided to fill a space between the support portion and a part of the housing.

REFERENCE SIGNS LIST 1 image display device
10 light source unit
10A light source section
10B cooling section
12a, 12b wheel storage portion
12c lens support portion
12d motor support portion
150 phosphor wheel
151 wheel substrate
152 fluorescent material
154 motor
160 buffer member
162 first sheet member
164 second sheet member

The invention claimed is:

1. A projector, comprising:
a light source unit;
an illumination optical unit that includes at least one lens array, a polarization conversion element and a condenser lens, wherein light emitted from the light source unit passes through the at least one lens array, the polarization conversion element and the condenser lens and is separated for each wavelength region; and
a projection lens configured to project the light from the light source unit via the illumination optical unit, wherein the light source unit includes a wheel substrate, a housing and a buffer member that is arranged between the wheel substrate and the housing along a direction of a rotating shaft.

2. The projector according to claim 1, wherein
the light source unit includes a motor support member that supports a motor and is fixed to the housing.

3. The projector according to claim 2, wherein
the motor support member is integrally formed with a lens support member supporting a lens for introducing the light emitted from the light source unit to the wheel substrate.

4. The projector according to claim 1, wherein
the light source unit includes a motor support member that supports a motor and is fixed to the housing; and
the buffer member is formed by laminating a plurality of sheet members different in hardness in a direction in which the motor support member faces to a part of the housing.

5. The projector according to claim 1, wherein
the light source unit includes a motor support member that supports a motor and is fixed to the housing; and
the buffer member includes a first sheet member in contact with the motor support member that is softer than a second sheet member in contact with a side of the first sheet member, the side being opposite to a side of the first sheet member in contact with the motor support member.

6. The projector according to claim 1, wherein
the light source unit includes one or more light sources.

7. The projector according to claim 1, wherein
the buffer member is provided on a side opposite to the wheel substrate in a rotating shaft direction of a motor.

8. The projector according to claim 1, wherein
the wheel substrate has a surface on which a fluorescent material is provided.

9. The projector according to claim 8, wherein
when the fluorescent material is irradiated with the light emitted from the light source unit, it emits fluorescence emission light in a different wavelength region.

10. The projector according to claim 1, wherein
the illumination optical unit includes at least one dichroic mirror.

11. The projector according to claim 10, wherein
the light emitted from the light source unit that has passed through the condenser lens is incident on the at least one dichroic mirror.

12. The projector according to claim 11, wherein
the at least one lens array is arranged on an optical path of the light source unit and the at least one dichroic mirror is arranged between the light source unit and the at least one lens array.

\* \* \* \* \*